United States Patent
Smith et al.

(10) Patent No.: US 7,106,301 B2
(45) Date of Patent: Sep. 12, 2006

(54) INPUT DEVICE WITH CABLE STORAGE

(75) Inventors: David L Smith, Corvallis, OR (US); Memphis Zhihong Yin, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 10/459,145

(22) Filed: Jun. 10, 2003

(65) Prior Publication Data

US 2003/0197684 A1      Oct. 23, 2003

Related U.S. Application Data

(62) Division of application No. 09/628,228, filed on Jul. 28, 2000, now Pat. No. 6,600,479.

(51) Int. Cl.
*G09G 5/08* (2006.01)
*B65H 75/30* (2006.01)

(52) U.S. Cl. ............ 345/163; 345/162; 345/156; 345/169; 242/385

(58) Field of Classification Search ........ 345/163, 345/162, 156, 166, 160, 175, 170, 169; 242/385; 206/702
See application file for complete search history.

(56) References Cited

U.S. PATENT DOCUMENTS

| | | | |
|---|---|---|---|
| 3,430,886 A | 3/1969 | Sweeny | |
| 4,802,638 A | 2/1989 | Burger et al. | |
| 5,042,159 A | 8/1991 | Millen | |
| 5,489,010 A * | 2/1996 | Rogers | 191/12.2 R |
| 5,600,719 A | 2/1997 | Lovecky et al. | |
| 5,760,766 A | 6/1998 | Auber et al. | |
| 5,828,364 A | 10/1998 | Siddiqui | |
| 5,831,597 A | 11/1998 | West et al. | |
| 5,914,702 A | 6/1999 | Derocher et al. | |
| 5,992,787 A | 11/1999 | Burke | |
| 6,043,807 A | 3/2000 | Carroll | |
| 6,088,021 A | 7/2000 | Yong | |
| 6,166,722 A | 12/2000 | Kawabe et al. | |
| 6,304,249 B1 | 10/2001 | Derocher et al. | |
| 6,325,665 B1 * | 12/2001 | Chung | 439/501 |
| 6,352,516 B1 | 3/2002 | Pozos et al. | |
| 6,392,635 B1 * | 5/2002 | Snyder | 345/163 |
| 6,421,044 B1 * | 7/2002 | Murphy | 345/163 |

FOREIGN PATENT DOCUMENTS

| | | | |
|---|---|---|---|
| EP | 653228 A1 * | 5/1995 | |
| JP | 3-123926 | 10/1989 | |
| JP | 2000-105668 | 11/1990 | |
| JP | 403123926 A | 5/1991 | |
| JP | 9307982 | 11/1997 | |

(Continued)

OTHER PUBLICATIONS

Mouse With no Tail (sku: w024-2); http://www.shapenet.com.

(Continued)

*Primary Examiner*—Guy Lamarre
*Assistant Examiner*—Fritz Alphonse

(57) ABSTRACT

An input device, which is capable of changing the appearance of a display, includes a body made up of a cover and a base, a cable receiver, and a cable coupled to the cable receiver. The input device has a first mode with a first portion of the cable having a first length external to the input device and a second portion of the cable wrapped around the cable receiver. The input device also has a second mode with the first portion of the cable having a second length external to the input device less than the first length.

9 Claims, 12 Drawing Sheets

FOREIGN PATENT DOCUMENTS

| | | | | |
|---|---|---|---|---|
| JP | 02000035855 A | * | 7/1998 | |
| JP | 200066833 A | | 3/2000 | |
| JP | 0200010566 | | 4/2000 | |
| NL | 1003471 C | | 7/1995 | |

OTHER PUBLICATIONS

Sony-MDR-E827G; http://www.sel.cony.com/SEL/consumer/ss5/portable/accessories/sportheadphones/indes.shtml.

The Apple Store (U.S.); http://store.apple.com/1-800-MY-APPLE/WebObjects/AppleStore.woa/243/wo/RmUfS1/QvetjDwgcJxp/3.5.0.3.28.1.

The Spider, 1999 Inventure(tm); www.web.connector http://www.inventured.com/index_spider.html.

How to Use Your New Shape Products—User Guide (Mouse With No Tail Kit); pp. 1-2; by: SHAPE-Global Technology Inc.

* cited by examiner

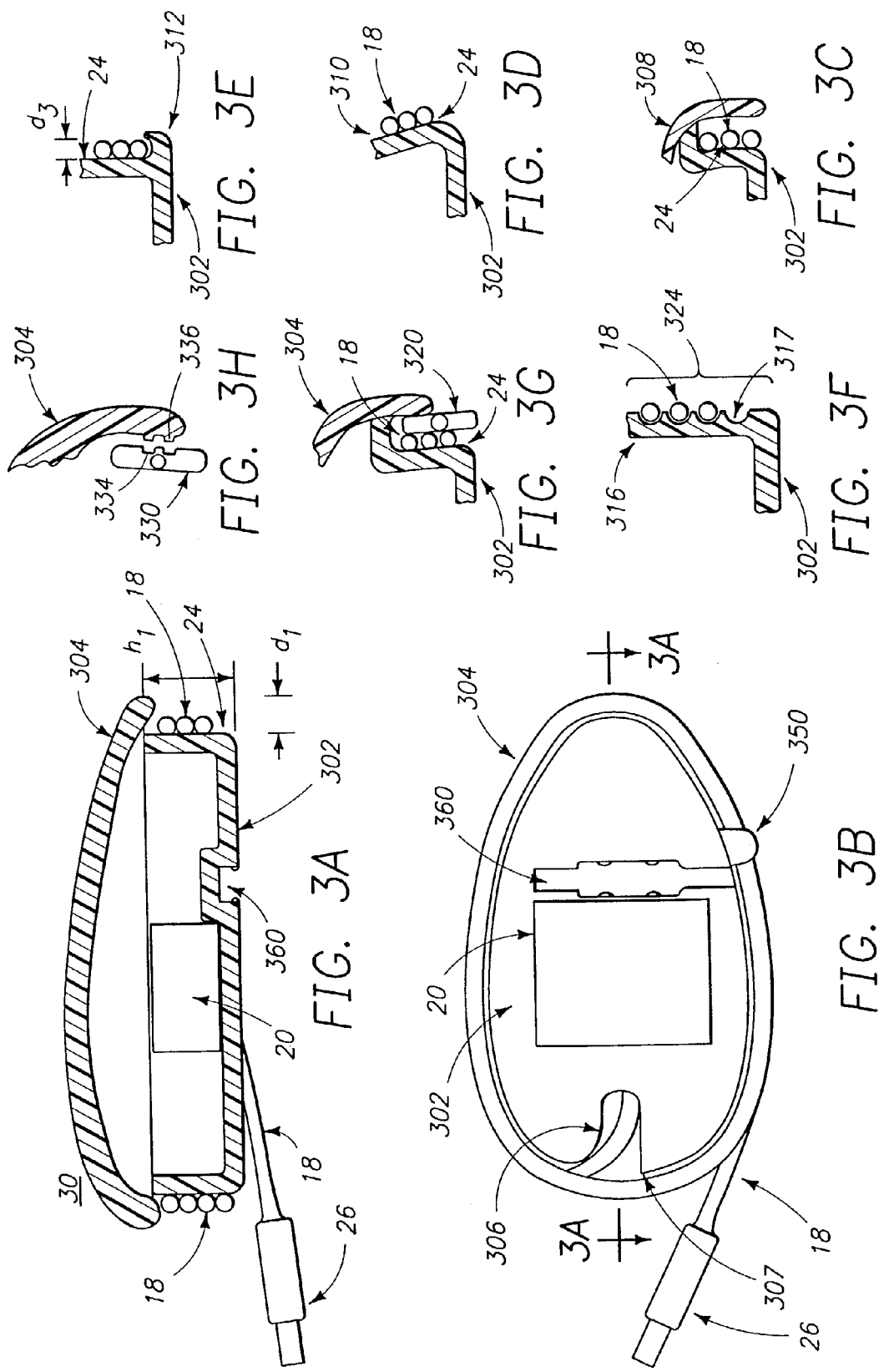

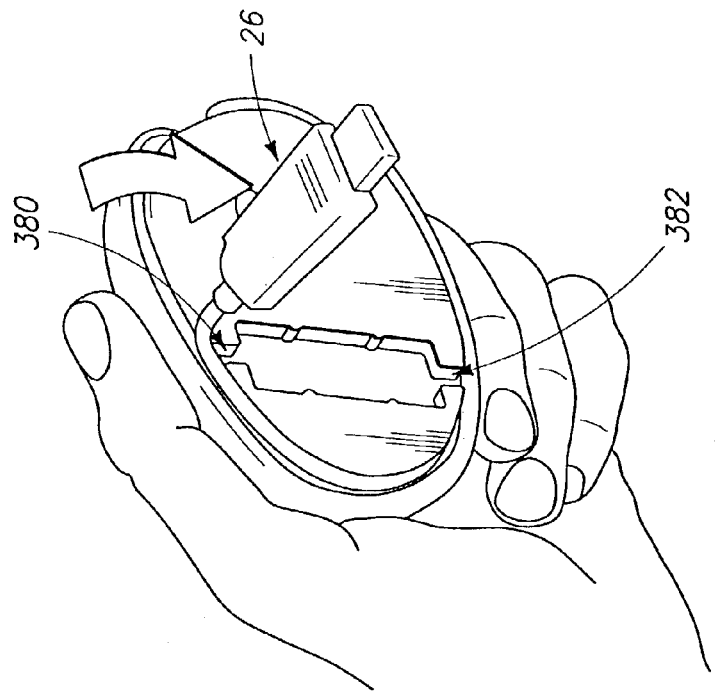
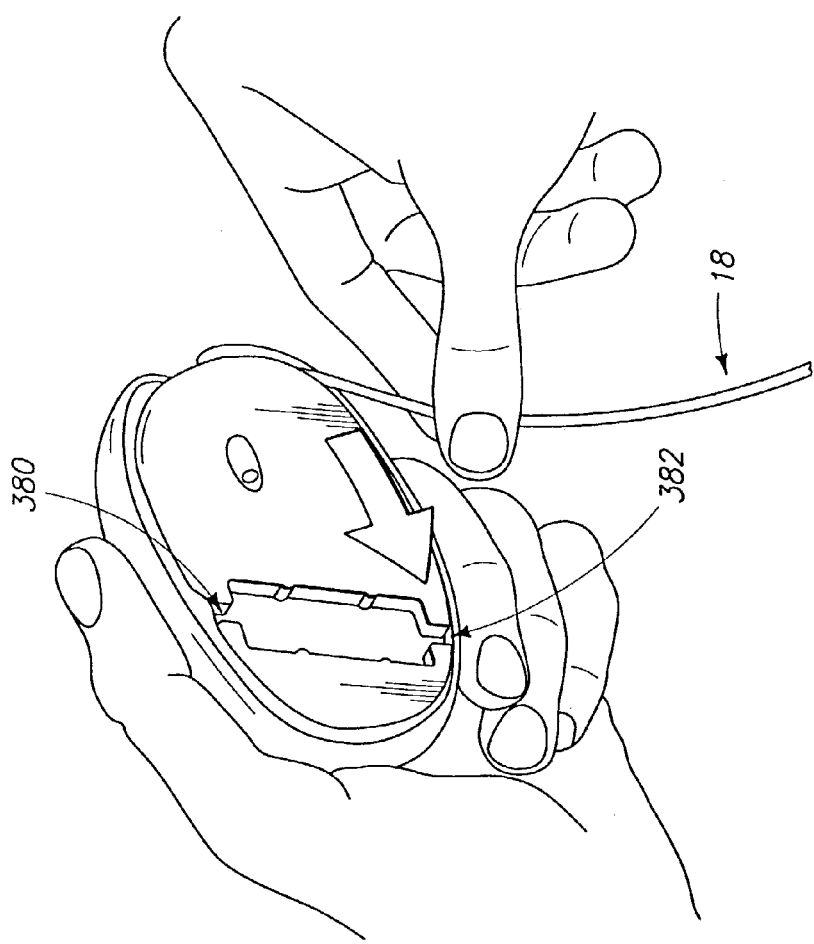
FIG. 3J
FIG. 3I

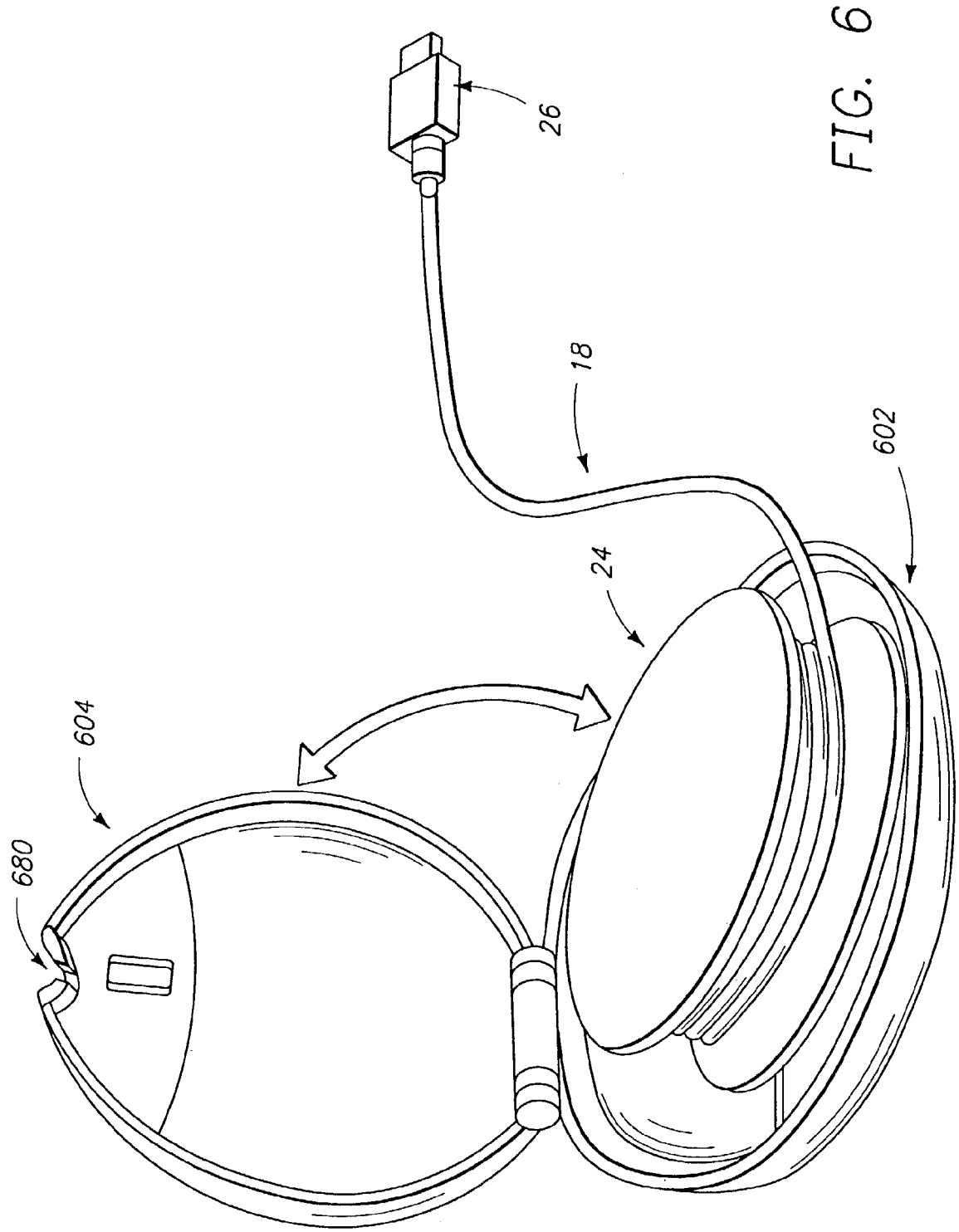

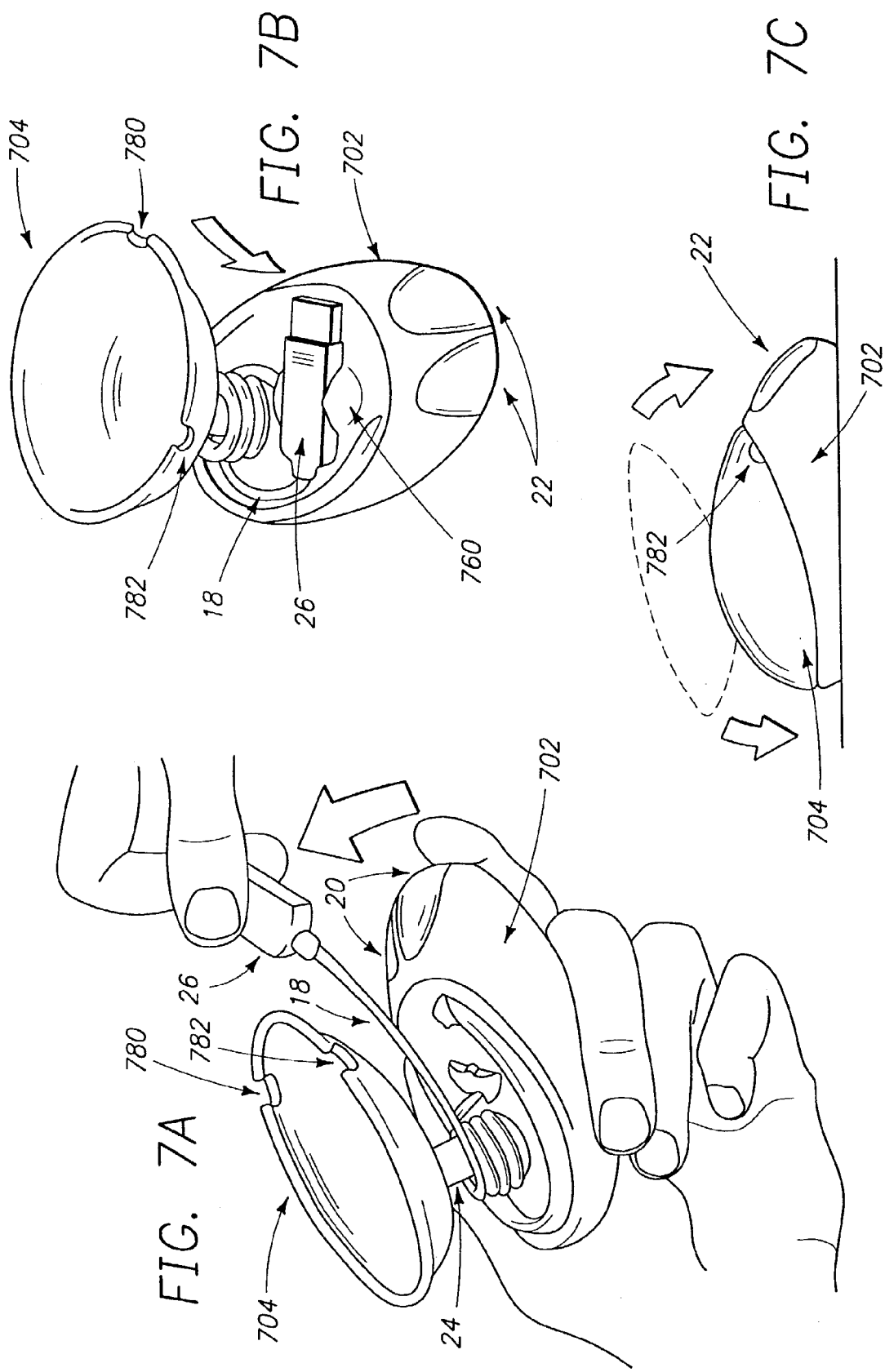

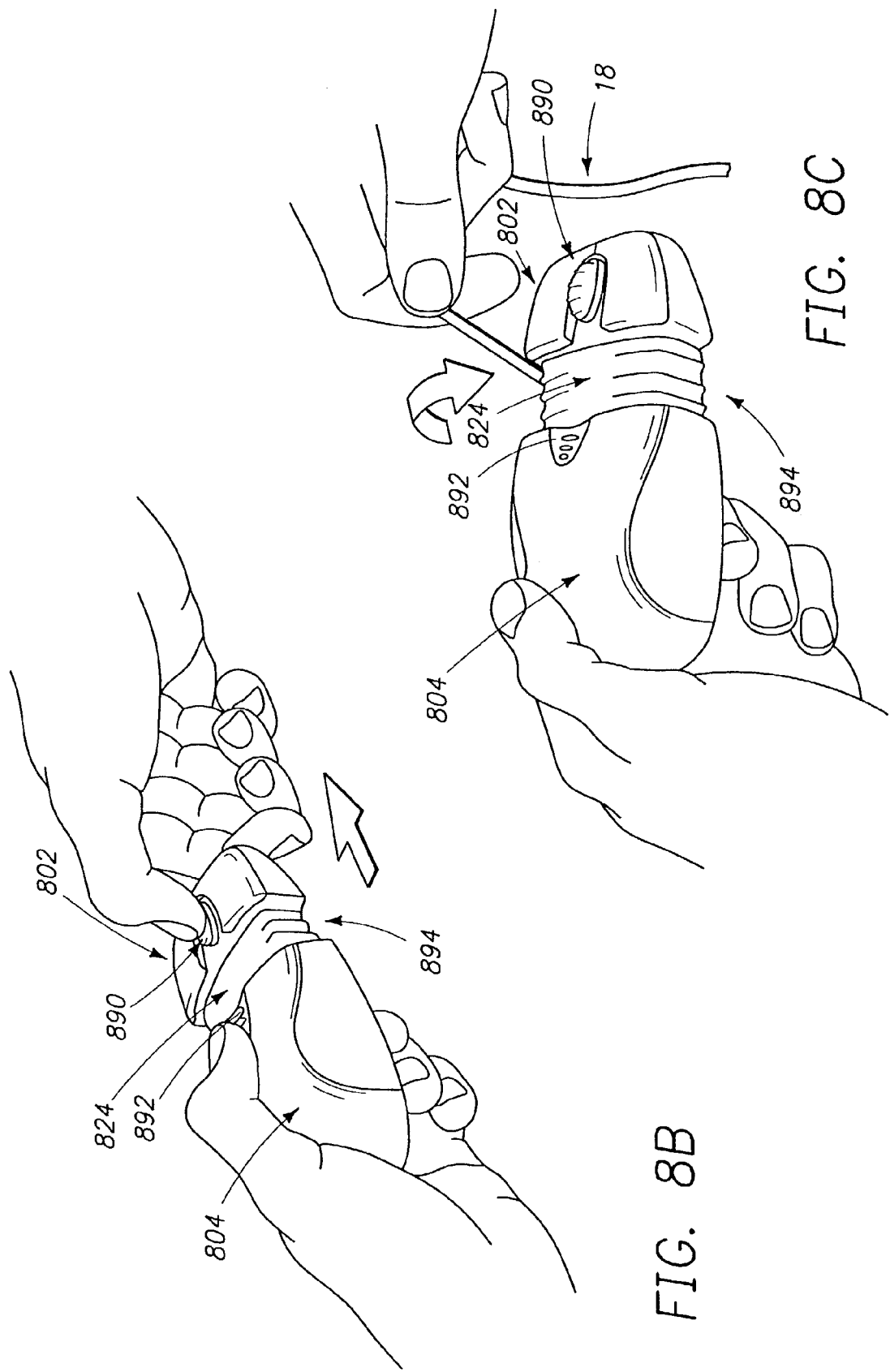

INPUT DEVICE WITH CABLE STORAGE

CROSS REFERENCE TO RELATED APPLICATION(S)

This is a divisional of application Ser. No. 09/628,228 filed on Jul. 28, 2000, now U.S. Pat. No. 6,600,479, which is hereby incorporated by reference herein.

BACKGROUND OF THE INVENTION

This invention relates generally to input devices for an electronic device such as a computer, and more particularly to a manually controlled input device for generating data for input to such an electronic device. This data is typically used to change the appearance of a display screen. More particularly, the present invention relates to a input device having cable storage.

A computer mouse is a common input device used to generate signals for control of a cursor or reference point on a computer display. Examples of computer mice are described in U.S. Pat. Nos. 5,828,364 and 5,914,702 for a desktop mouse and a portable computer mouse, respectively. A computer mouse often includes one or more buttons or switches which can either be dedicated or programmed to correspond to a specific command function (e.g. "click" to select a display icon, "double click" to open the item associated with the display icon, display a menu item, or provide some custom function). A computer mouse, in addition, often includes a cable for transmitting signals to the display, typically via a computer. Other common input devices include a trackball, touchpad device, and a joystick. Each of these devices also controls the movement of a cursor on a computer display screen, and typically includes buttons for entering specific functions, and a cable for transmitting data to the microprocessor.

Portable computers, such as laptops, notebooks, hand held and palm top computers, have become quite popular. People are increasingly using portable computers while traveling. In most cases these portable computers contain one or more input devices such as, a built in mouse, or a touchpad device, or small joystick, commonly referred to as a pointing stick. Many users find these devices on portable computers to be less than optimal. The small size tends to make them very sensitive to movement, which creates difficulty in easily controlling the movement of the cursor compared to the size of a pointing device found with a desktop computer. They are also typically unfamiliar to desktop personal computer users. Therefore, many users carry a separate, full size computer mouse with them while traveling to use with the portable computer. This leads to the undesired effect of having to store the computer mouse in a carrying case, which takes up scarce space. Typically, the computer user winds the cable against itself in a more manageable length using a rubber band or tie to prevent the cable from unraveling. In other cases, the user simply wraps the cord around the computer mouse, again using a rubber band or tie to prevent the cable from unraveling or slipping off the computer mouse. Since many computer mice have rounded edges, corners, and gently sloping contours for ergonomic purposes, keeping a cable wrapped around a mouse is difficult. The use of a computer mouse in this manner leads to a bulky, cumbersome and unorganized object which is less than optimal when traveling. Further, this crude storage manner lends itself to dirt coming into contact with the cable connector during storage, which can result in interference with the connection or transmission of data.

Storage is not the only issue confronting computer users while traveling. Many users operate their computers, while traveling, in cramped and confined spaces such as during flights, on trains, or in hotel rooms. In these situations, the cord of a full size computer mouse can become easily entangled on another object, such as an airline seat tray, thus making the mouse difficult to operate.

SUMMARY OF THE INVENTION

An input device, which is capable of changing the appearance of a display, includes a body made up of a cover and a base, a cable receiver, and a cable coupled to the cable receiver. The input device has a first mode with a first portion of the cable having a first length external to the input device and a second portion of the cable wrapped around the cable receiver. The input device also has a second mode with the first portion of the cable having a second length external to the input device less than the first length.

BRIEF DESCRIPTION OF THE DRAWINGS

FIG. 3a is a planar side view of an input device according to an embodiment of this invention;

FIG. 3b is a bottom view of an input device according to an embodiment of this invention;

FIG. 3c is a view of the cover extending over a portion of the base according to an embodiment of this invention;

FIG. 3d is a cross-sectional view of a portion of the base according to an embodiment of this invention;

FIG. 3e is a cross-sectional view of the rim on a portion of the base according to an embodiment of this invention;

FIG. 3f is a cross-sectional view of a portion of the base with grooves according to an embodiment of this invention;

FIG. 3g is a cross-sectional view of the retainer clip in storage mode according to an embodiment of this invention;

FIG. 3h is a cross-sectional view of the retainer clip in storage mode with mating structures between the clip and body according to an embodiment of this invention;

FIGS. 3i–j are two perspective views of the input device showing how the cord is wrapped around the cable receiver according to an embodiment of this invention;

FIG. 6 is a perspective view of the input device with the cable receiver inside the base and accessible through a cover in the top of the base according to an embodiment of this invention;

FIG. 7a is a perspective view of the input device with a flexible cover in an up configuration according to an embodiment of this invention;

FIG. 7b is a perspective view of the input device with a flexible cover in a down configuration according to an embodiment of this invention;

FIG. 7c is a perspective view of the input device with a flexible cover in an up configuration showing the cable connector snapped into the connector receiver according to an embodiment of this invention;

FIGS. 8b–8e are various perspective views of the input device comprised of two sections showing how the cord is wrapped around the cable receiver according to an embodiment of this invention;

DETAILED DESCRIPTION

Figure 1:
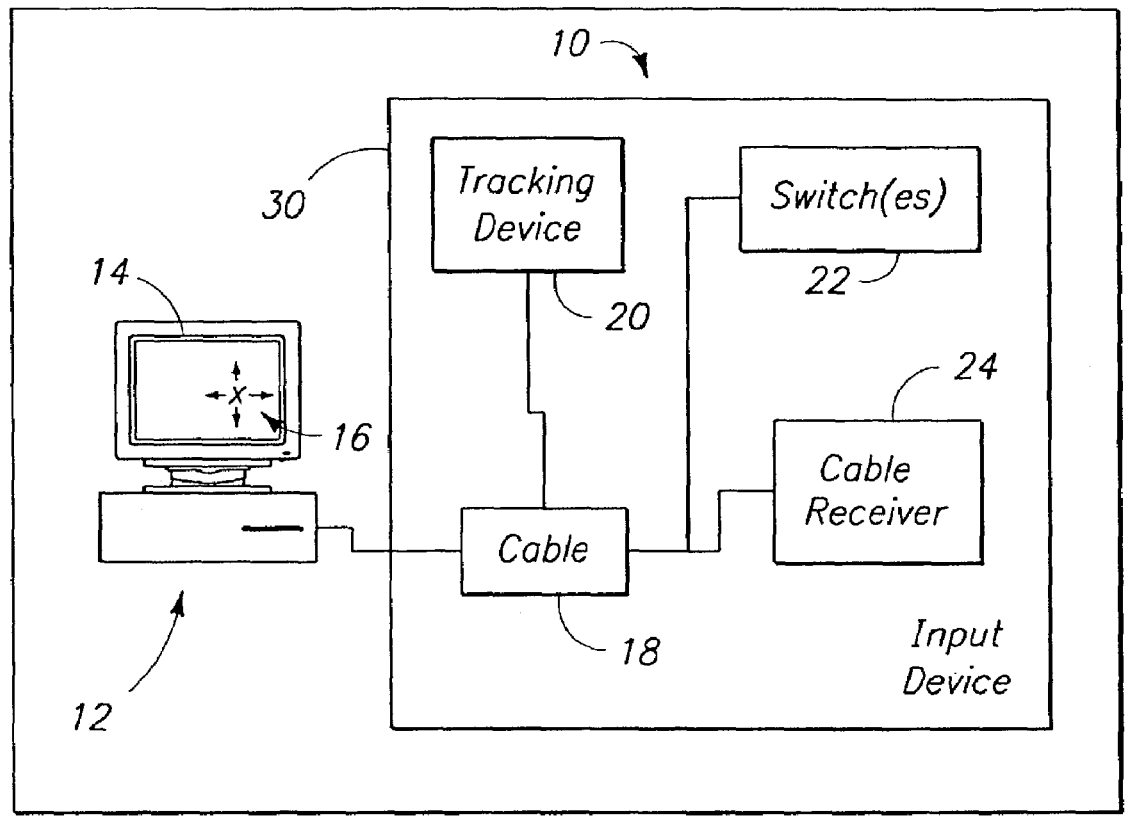
FIG. 1 is a diagram of an input device coupled to a display according to an embodiment of this invention.

Referring to FIG. 1 input device 10 is used with display 14 to control the movement of cursor 16 or other reference displayed on display 14. Input device 10 includes tracking device 20, one or more switches 22, and cable receiver 24, all housed within body 30, and cable 18 providing a communication interface between input device 10 and display 14 typically via computer 12. Although other types of cable can be used, it is preferable that cable 18 is a shielded cable. Signals generated by tracking device 20 and switches 22 are sent to display 14 through the communication interface using a prescribed protocol. These signals can either be sent directly to display 14 if it contains a processor or other means capable of utilizing the signals, or indirectly via computer 12. Cable receiver 24 is formed to secure cable 18 without the need for a rubber band or tie to keep cable 18 in place.

Typically, tracking device 20 consists of a mechanical, optomechanical, or optical detection system. In both mechanical and optomechanical tracking devices either a rubber or rubber coated ball is mounted inside body 30 such that the ball protrudes slightly from the bottom surface of body 30. The ball typically rests against two rollers perpendicular to each other with a third spring-loaded roller that captures the ball in place. In a mechanical system movement of the ball causes sensors to send electrical signals through cable 18 to either display monitor 14 or computer 12. In optomechanical systems light-emitting diodes (LEDs) sense movement of the ball. Optical systems have no moving parts, and typically operate by determining the direction and magnitude of movement using either: a) LEDs (2 different colors, one for each orthogonal direction) and a special reflective pad containing gridlines (spacing for each orthogonal direction optimized for each LED color), by detecting motion using light detectors; or b) by using a system which measures changes in position by optically acquiring images (frames) and mathematically determining motion.

In one embodiment tracking device 20 is an optical system that includes a sensor, lens and LED assembly manufactured by Agilent Technologies of Palo Alto, Calif., part numbers HDNS-2000 (Sensor), HDNS 2100 (Lens), HDNS-2200 (LED Assembly Clip) and HLMP-ED80 (High Light Output red LED). This tracking system embodiment includes no moving parts and allows tracking of device movement over any surface. Although other tracking devices can be used, it is preferable that the size of the tracking system be kept minimal to allow the input device to be stored in as small a volume as practical. In particular, an optical tracking device is preferred over a mechanical or optomechanical device housing a captured ball, because an optical based system takes up considerably less space. Further, an optical based tracking device allows the input device to be used over non-planar surfaces. In addition, this removes a limitation of many input devices, the requirement to use a generally planar pad.

Figure 2C:
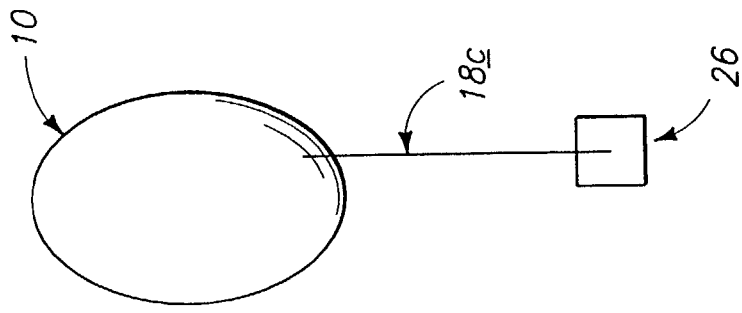
FIG. 2c is a diagram of an input device in third mode according to an embodiment of this invention.
Figure 2B:
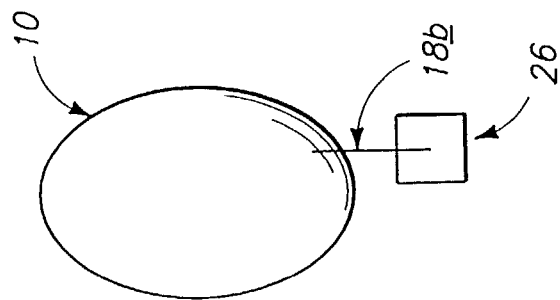
FIG. 2b is a diagram of an input device in a second mode according to an embodiment of this invention.
Figure 2A:
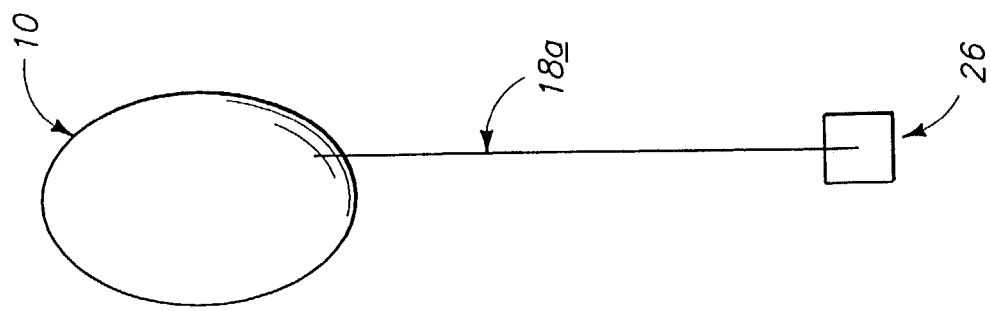
FIG. 2a is a diagram of an input device in a first mode according to an embodiment of this invention.

Referring to FIG. 2, input device 10 can be operated in a plurality of modes. A first mode is shown in FIG. 2a where a relatively large portion of cable 18 is external to input device 10 (shown as portion 18a) and thus is available to the user. In this mode (operational), input device 10 is connected to display 14 or computer 12 via connector 26 in a typical office or home environment. A second mode is shown in FIG. 2b where a small to non-existent portion of cable 18 is external to input device 10 (shown as portion 18b). In this mode (storage), input device 10 is not connected to computer 12 or display 14 and a substantial portion of cable 18 is wrapped around cable receiver 24 (not shown). A third mode (intermediate) is shown in FIG. 2c, where an intermediate portion of cable 18 is external to input device 10 (shown as portion 18c) and thus available to the user. In this mode, input device 10 is typically connected to display 14 or computer 12 via connector 26. The third mode is typically used in an environment where space may be at a premium (airplane, train, hotel room etc.) and computer 12 or display 14 is in close proximity to input device 10.

Referring to FIG. 3a, an embodiment of input device 10 of the present invention is shown where cable receiver 24 is part of the exterior surface of body 30. FIG. 3a is a planar side view, where cover 304 encloses the top of base 302 and extends over the base a distance d1. The distance d1 is preferably larger than the radius of cable 18. In this embodiment, cover 304 and base 302 make up body 30 of the input device. Tracking device 20 is housed within body 30. In this embodiment, the outer side surfaces of base 302 act as cable receiver 24. Preferably, the height of base 302 (h1) is sufficient to allow the length of cable 18 to be completely or near completely wrapped around base 302. The combination of a smooth rounded wall 306 with a radius of curvature "r" sufficient to provide stress relief when the cable is wrapped around it, and a straight wall structure 307 directly opposite to the rounded wall 306 with little or no radius of curvature is preferably incorporated into base 302 creating a channel where cable 18 leaves input device 10, as shown in FIG. 3b. This structure acts to facilitate wrapping of cable 18 in the storage configuration (FIG. 2b) in the preferred direction around structure 306. The much tighter bend in cable 18 obtained when wrapping cable 18 around structure 307 provides the user tactile feedback that cable 18 is being wrapped in a non preferred direction. Wrapping in a clockwise direction ensures connector 26 is positioned correctly after winding such that it will stow properly. The width of the channel created by structures 306 and 307 is preferably at least the diameter of cable 18 and could be substantially larger than the diameter of cable 18 as shown in FIG. 3b. Ledge 350 is also part of base 302, as shown in FIG. 3b, and extends out from the base a sufficient distance to provide support for cable 18 when completely wrapped around cable receiver 24. Ledge 350 acts to keep cable 18 from slipping off cable receiver 24. In an alternate embodiment ledge 350 also contains a raised lip which further hinders cable 18 from slipping off cable receiver 24. FIG. 3b also shows connector receiver 360 formed into base 302, which accepts connector 26 in a snap fit for use in the storage configuration. In the embodiment as depicted in FIG. 3*b,* connector receiver 360 is substantially the size and shape of connector 26 and is formed into base 302 such that no structures protrude out from base 302 when connector 26 is removed from connector receiver 360. Although a perfectly planar surface is not required for base 302, a substantially planar surface is desired.

The preferred direction shown in FIG. 3*b* is for clockwise wrapping; however, if desired the preferred direction can be made counterclockwise by simply reversing structures 306 and 307. This may be advantageous for left handed users. If the wrapping direction is changed then the position of connector receiver 360 also must be changed to accommodate the change in position of cable 18 when fully wrapped around cable receiver 24 in the new direction.

FIG. 3*c* shows an alternate embodiment of the present invention in cross section where cover 308 extends to the bottom of base 302 covering cable 18 when wound around base 302. However, those skilled in the art will appreciate that intermediate extensions of cover 308 can also be utilized.

FIG. 3*d* shows an alternate embodiment of the present invention in cross section where base 310 is constructed such that the top of base 310 is narrower than the bottom of base 310. This kind of structure further facilitates wrapping of cable 18 and once wrapped helps prevent the wrapped cable 18 from slipping off base 310 during storage.

FIG. 3*e* shows an alternate embodiment of the present invention in cross section where cable receiver 24 contains rim 312 on the bottom of base 302. Rim 312 extends out from base 302 a distance d3 that is larger than the radius of cable 18. Rim 312 provides support for cable 18 to hinder cable 18 from slipping off cable receiver 24 when cable 18 is fully wrapped around cable receiver 24.

FIG. 3*f* shows an alternate embodiment of the present invention in cross section where cable receiver 324 contains a number of grooves 317 which form contours around base 302 to provide improved wrapping and support for cable 18 once it is wrapped and in the storage mode. This embodiment contains grooves 317 that are preferably in depth in excess of the radius of the cable and form a spiral or screw pattern on cable receiver 316. However, those skilled in the art will appreciate that a series of concentric groves can also be utilized.

FIG. 3*g* shows an alternate embodiment of the present invention in cross section where retainer clip 320 is an integral part of cable 18 in close proximity to connector 26. After wrapping of cable 18 around cable receiver 24 is completed, retainer clip 320 is pushed up between cable receiver 24 and cover 328, thereby securely holding connector 26 and cable 18 to input device 10. A further improvement to this embodiment is shown in FIG. 3*h* where retainer clip 330 has indents 334 which mate with ridges 336 that are incorporated into cover 304.

Multiple combinations of the embodiments shown in FIGS. 3*a*–3*h* can also be used. For example, the tapered wall shown in FIG. 3*d* can be combined with the grooves shown in FIG. 3*f* and the extended cover of FIG. 3*c* to create another embodiment. Another example would be to combine the tapered wall shown in FIG. 3*d* with the rim shown in FIG. 3*e* to create another embodiment. Those skilled in the art can envision combining these structures shown in FIGS. 3*a*–3*h* as well as other structures for wrapping to create even more embodiments.

FIG. 3*i* is a perspective view of an alternate embodiment of the present invention of input device 10, where the user is wrapping cable 18 around cable receiver 24. In this figure, cable 18 is wrapped clockwise onto cable receiver 24. FIG. 3*j* is a perspective view of this embodiment of input device 10 where cable 18 has been wrapped around cable receiver 24 and the user is inserting connector 26 into connector receiver 360, with cable 18 proximate to connector 26 in cable channel 380. FIG. 3*j* also shows cable channel 382 which allows connector 26 to be inserted into connector receiver 360 when cable 18 is wrapped in a counter clockwise direction. The ability to wrap cable 18 in either the clockwise or counterclockwise direction provides both left and right handed users the ability to wrap cable 18 in whichever direction is most convenient. Cable channels 380 and 382 also provides the advantage that the same input device can be optimized to operate in the third mode, with an intermediate amount of cable available to the user, as shown in FIG. 2*c*. In this mode, in this embodiment, cable 18 can extend either on the left or right side of input device 10, by placing cable 18 through both channels 380 and 382. This is advantageous for both right and left handed users when operating in an environment where space maybe at a premium such as providing left hand users the convenience of having input device 10 on the left side of display 14 and right hand users the convenience of having input device 10 on the right side of display 14.

Figure 4A:
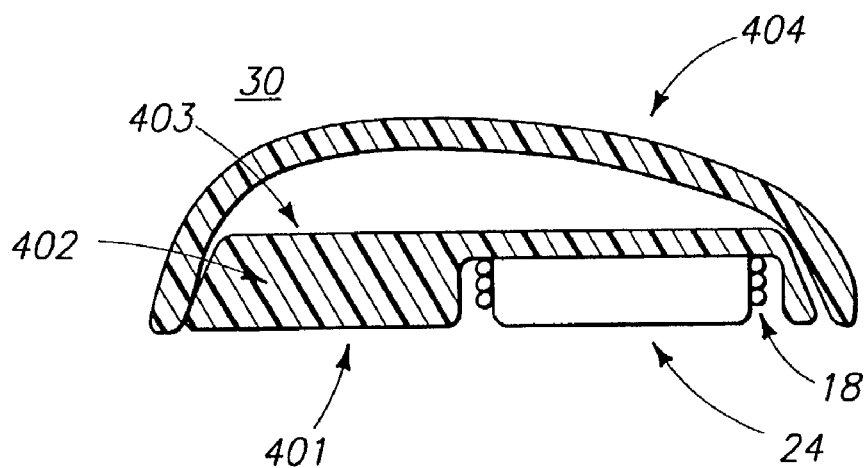
FIG. 4a is a planar side view of an input device according to an embodiment of this invention.
Figure 4B:
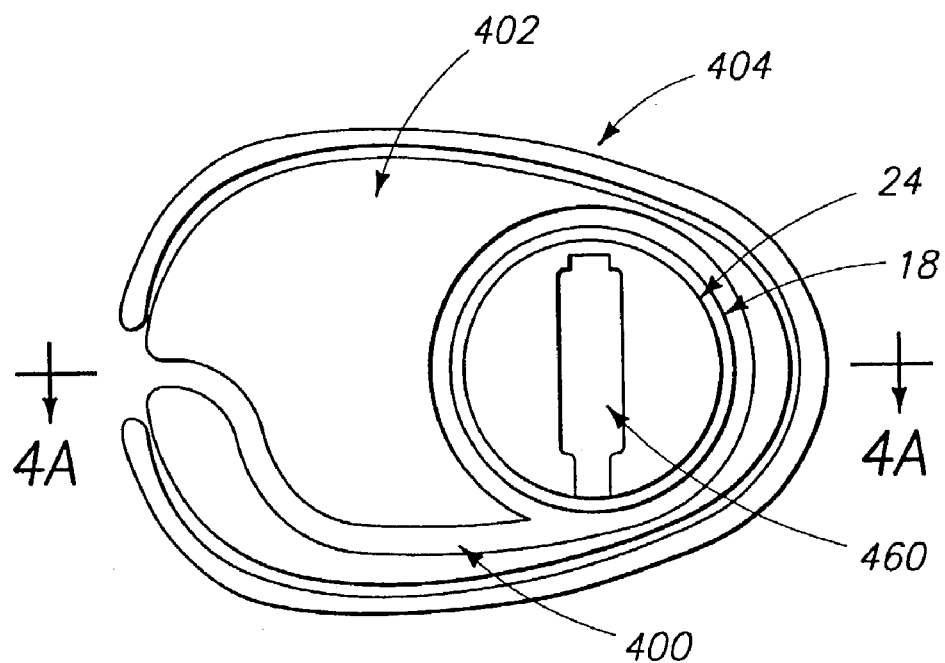
FIG. 4b is a bottom view of an input device to an embodiment of this invention.

FIGS. 4*a*–4*b* show an alternate embodiment of the present invention where cable receiver 24 is recessed in the bottom of base 402 such that access to cable receiver 24 is via the bottom of base 402. Cable receiver 24 accepts connector 26. FIG. 4*a* is a planar side view, where cover 404 encloses base top 403 of base 402 and extends to base bottom 401 of base 402. In this embodiment, cover 404 and base 402 make up body 30 of input device 10. Tracking device 20 is housed within body 30. An embodiment is shown in FIG. 4*a* where the bottom of cable receiver 24 is flush with the bottom of base 402. Those skilled in the art will appreciate that the bottom of cable receiver 24 can also be positioned at various heights above the bottom of base 402. Cable channel 406 has been incorporated into base 402 as shown in FIG. 4*b*, to provide a path for cable 18 to extend from input device 10, while maintaining a substantially planar surface for the bottom of base 402. FIG. 4*b* also shows connector receiver 460 that is substantially the size and shape of connector 26 and is formed into cable receiver 24 such that no structures protrude out from cable receiver 24 when connector 26 is removed from connector receiver 360. Although FIGS. 4*a* and 4*b* show the cable receiver with a simple cylindrical structure, numerous other structures are also possible. For example, a spool structure such as structure 524 shown in FIGS. 5*a* and 5*b* could be used. A single rim structure as shown in FIG. 3*e*, with or without a taper as shown in FIG. 3*d* and with or without grooves as shown in FIG. 3*f,* are other exemplary structures.

FIGS. 4*a* and 4*b* show an embodiment with cable receiver 24 preferably positioned at one end of input device 10. Other embodiments would have the position of cable receiver 24 at various other locations within the base.

Figure 5A:
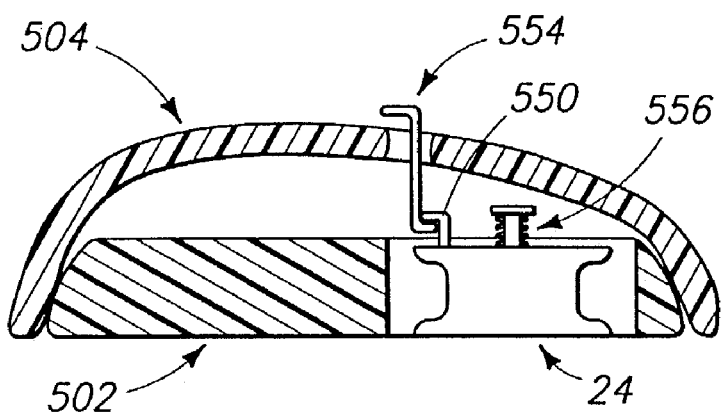
FIG. 5a is a cross-sectional view of the base with the cable receiver in a first position according to an embodiment of this invention.
Figure 5B:
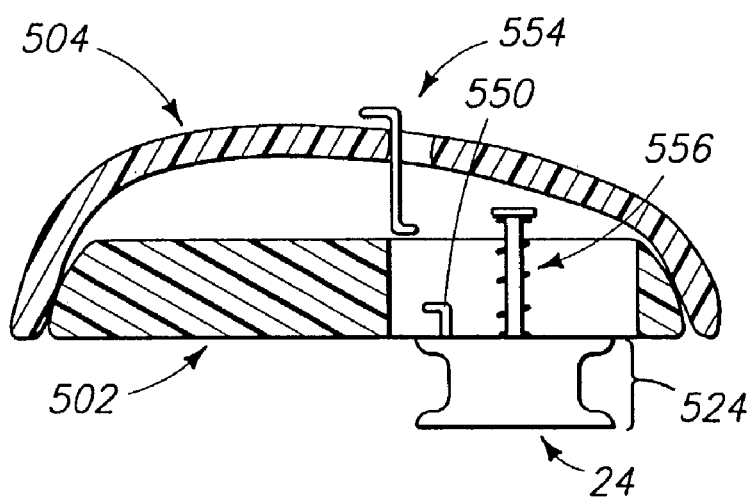
FIG. 5b is a cross-sectional view of the base with the cable receiver in a second position according to an embodiment of this invention.

FIGS. 5*a* and 5*b* show an alternate embodiment where cable receiver 24 contains latch mechanism 550 which, when activated, changes the position of the cable receiver. FIG. 5*a* shows cable receiver 510 fully encompassed within base 502. When lever 554, which extends above cover 504, is disengaged from latch mechanism 550, spring 556 forces cable receiver 24 into a second position to extend from base 502. FIG. 5*b* shows cable receiver 24 in the second position in which cable receiver 24 extends from base 502 facilitating wrapping cable 18 around cable receiver. Although FIGS. 5*a* and 5*b* show cable receiver 24 having a spool structure 524 with a rim at both the top and bottom, those skilled in the art readily recognize that structures as described in FIGS. 3 and 4 as well as other structures used for storing cable or cord can also be utilized. Although FIGS. 5a and 5b show lever 554 and latch mechanism 550 to reversibly move cable receiver 24 from position one and position two, those skilled in the art readily recognize that many different types of latch mechanisms can also be utilized, such as a push to release mechanism.

FIG. 6 shows an alternate embodiment of the present invention where cable receiver 24 is contained within base 602 such that access to cable receiver 24 is obtained by opening lid 604. FIG. 6 shows lid 604 in the open position allowing for wrapping and unwrapping of cable 18 around cable receiver 24. FIG. 6 also shows cable channel 680 which allows cable 18 to extend from the front of input device 10. Although FIG. 6 shows only one cable channel 680, those skilled in the art will appreciate that more than one cable channel in lid 604 could be used.

FIGS. 7a–7b show an alternate embodiment of the present invention where cable receiver 24 is contained within base 702 such that access to cable receiver 24 is through flexible lid 704 when flexible lid 704 is in an open or everted shape. Access to cable receiver 24 is limited when flexible lid 704 is in a convex shape as shown in FIG. 7c. Flexible lid 704 is preferably made of a thermoplastic elastomer such as that manufactured under the trademark Santoprene, by Advanced Elastomer Systems. However, those skilled in the art will appreciate that other materials such as polychloroprene rubbers, chlorosulfonated polyethylene rubber, elastomeric terpolymers of Ethylene-Propylene-Diene Monomers (commonly referred to as EPDM), and others can also be utilized.

FIG. 7a shows cable 18 in the process of being wrapped around cable receiver 24. FIG. 7a also shows cable channels 780 and 782 which allows cable 18 to extend out of input device 10, either to the left side or to the right side, in either the first or third mode of operation as shown in FIGS. 2a and 2c. The pliability of flexible lid 704 also allows the user to unwrap additional cable from cable receiver 24 when desired without the need to raise flexible lid 704 in the concave shape. FIG. 7b is a perspective view of input device 10 where cable 18 has been wrapped around cable receiver 24 and connector 26 has been inserted into connector receiver 760. Switches 22 on base 702 are also shown in FIGS. 7a–7c.

Cable channels 780 and 782 also provide the advantage that the same input device can be optimized to operate with an intermediate amount of cable available to the user, as shown in FIG. 2c, either on the left or right side of display 14. This is advantageous for both right and left handed users when operating in an environment where space maybe at a premium. Although both cable channels 780 and 782 are shown in FIG. 7a only one channel is required to operate input device 10 in this embodiment. It is also possible to operate input device 10 in this embodiment with either one or two cable channels located on base 702, preferably in the case of two cable channels one cable channel to the left of switches 22 and the second cable channel to the right of switches 22.

Figure 8A:
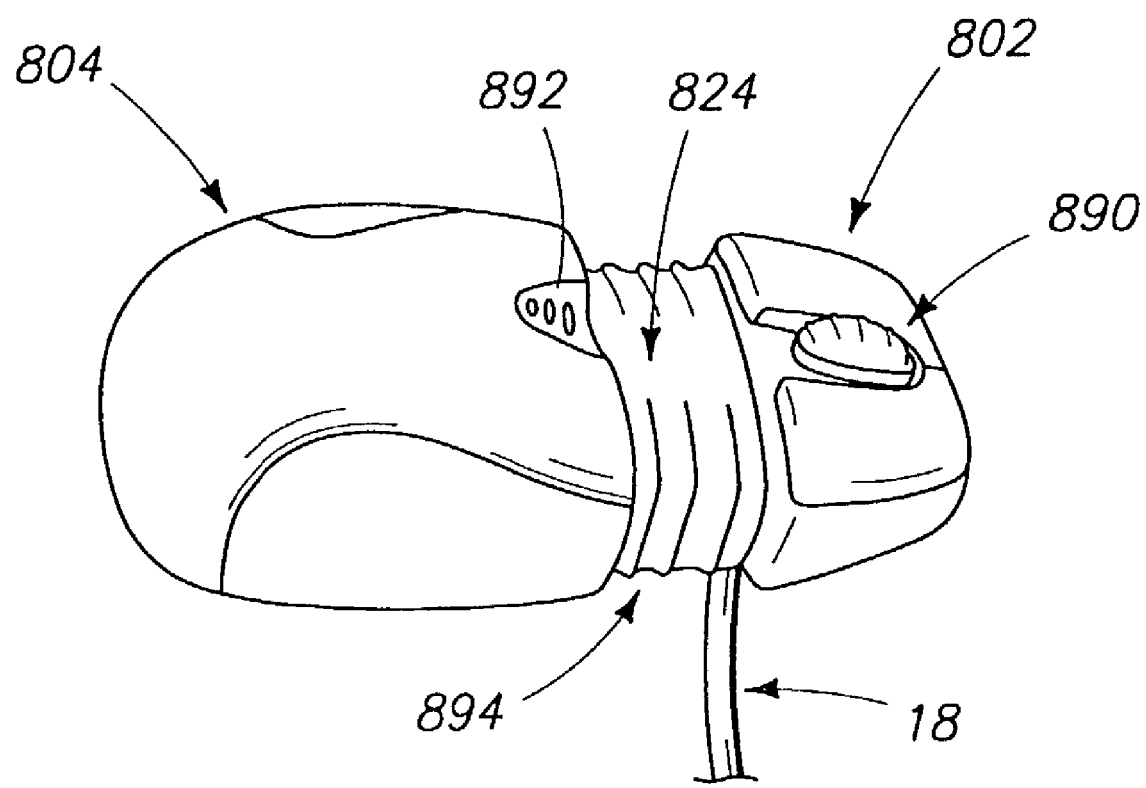
FIG. 8a is a perspective view of the input device comprised of two sections which slidably engage with each other according to an embodiment of this invention.

FIGS. 8a–8c show an alternate embodiment of the present invention where input device 10 consists two sections, which slidably engage with each other. FIG. 8a shows cover section 804 that forms one section of input device 10 and a second section. The second section contains base 802 and cable receiver 824, in a disengaged mode used when either wrapping or unwrapping cable 18 from cable receiver 824 and cable 18 is not connected to computer 12 or display 14.

The disengaged mode can also be used when operating input device 10 in either an operational mode or intermediate mode, as shown in FIGS. 2a and 2c respectively, allowing the user a larger and possibly more favorable ergonomic shape of input device 10.

Figure 8D:
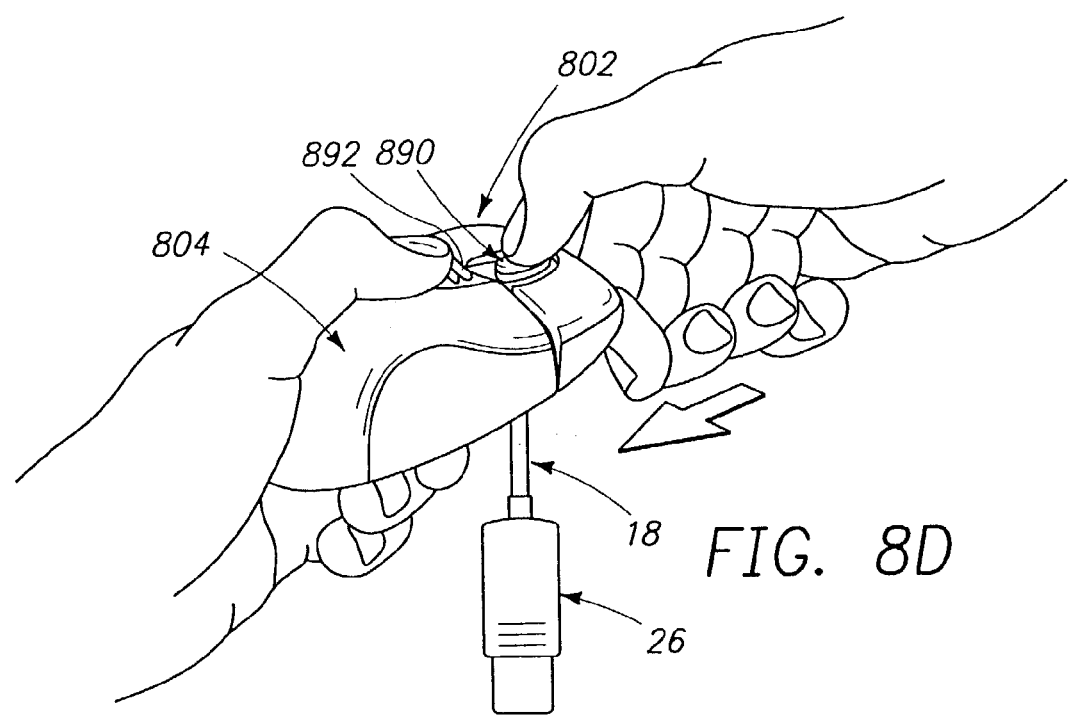

An engaged mode is shown in FIG. 8d, which is the mode used either during storage (compact volume) or in an operational or intermediate mode (when the larger volume is not desired by the user) when cable 18 is connected to computer 12 or display 14. An embodiment shown in FIG. 8a has grooves or ridges 894, which facilitate wrapping of cable 18 in an organized manner around cable receiver 824. Also shown in FIG. 8a is indent 892 formed into the exterior of cover section 804 that allows the user to grasp cover section 804 with sufficient force in a convenient, natural and ergonomically favorable manner to cause the two sections to disengage. FIG. 8a also shows button 890 located on the top portion of base 802 that allows the user to grasp base section 802 with sufficient force in a convenient, natural and ergonomically favorable manner to cause the two sections to disengage. Both indent 892 and button 890 preferably contain a series of 2–3 ridges that further facilitate gripping. Although the embodiment shown uses indent 892 on one section and button 890 located on the second section to facilitate disengaging the two sections, those skilled in the art will appreciate that any combination of two indents, two buttons, or any other structure fall within the spirit and scope of the invention.

Figure 8E:
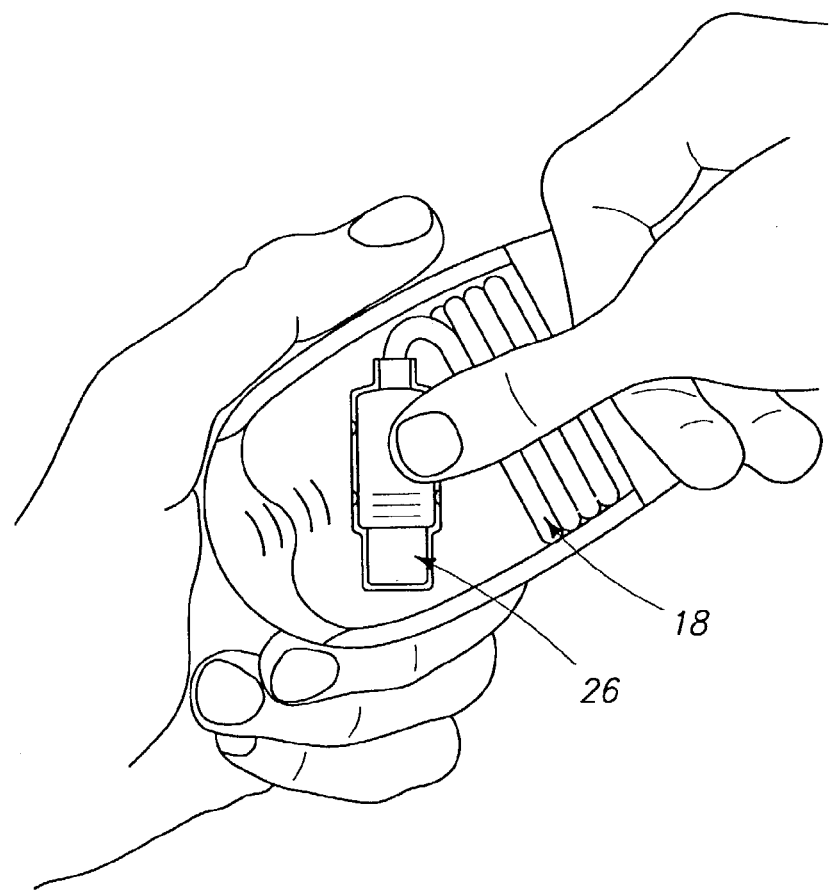
Figure 8F:
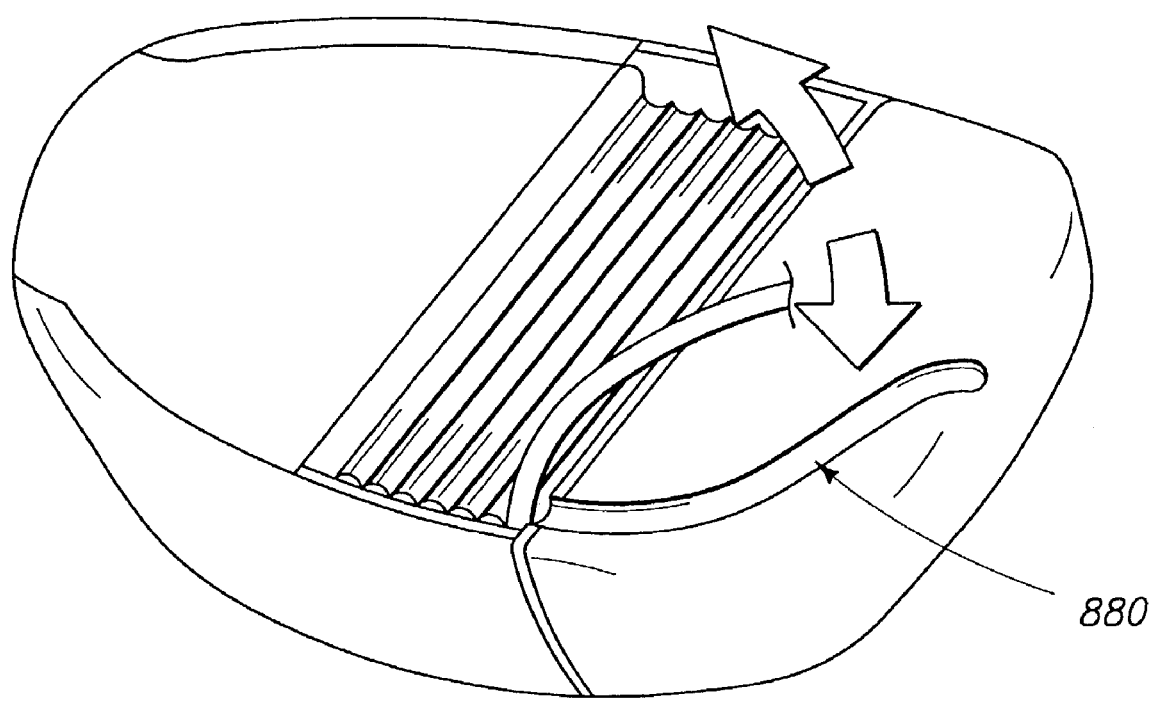
FIG. 8f is a perspective view of the bottom of the input device comprised of two sections showing how the cable is placed into the cable channel according to an embodiment of this invention.

FIGS. 8b–8e are various perspective views of input device 10 showing the user wrapping cable 18 around cable receiver 24 in an embodiment consisting of two sections which slidably engage with each other. FIG. 8b shows the user grasping cover section 804 and base 802, pulling with sufficient force to cause the two sections to disengage. FIG. 8c shows the user wrapping the cord around cable receiver 24. After cable 18 is wrapped around cable receiver 24 the user grasps cover section 804 and base 802, as shown in FIG. 8d, pushing with sufficient force to cause the two sections to engage. FIG. 8e shows the user inserting connector 26 into connector receiver 860. FIG. 8f shows cable channel 880 formed in base 802 to provide a path for cable 18 to extend from input device 10.

What is claimed is:

1. A method for storing a cable, having a connector, in a body housing a cable receiver non-rotatable relative to the body, and the connector is connected to a computer, comprising the steps of:
   disconnecting the cable from the computer;
   opening a lid hingedly connected to the body;
   wrapping the cable around the non-rotatable cable receiver; and
   inserting the connector into a connector receiver disposed within the body.

2. The method of claim 1, further comprising:
   removing the cable from a cable channel disposed in said lid; and closing the lid.

3. A method for storing a cable, having a connector, of an input device capable of changing the appearance of a display, comprising the steps of:
   disconnecting the cable from a computer;
   holding a base of a body of the input device;
   urging a flexible lid into an everted shape, the flexible lid coupled to the body; and
   wrapping the cable around a cable receiver non-rotatable relative to the body of the input device.

4. The method of claim 3, further comprising inserting the connector into a connector receiver disposed on or within the body of the input device.

5. The method of claim 3, wherein urging the flexible lid further comprises urging a flexible lid formed from an elastically deformable material.

6. The method of claim 3, wherein urging the flexible lid further comprises urging a flexible lid attached to the cable receiver.

7. The method of claim 3, wherein urging the flexible lid further comprises urging a flexible lid in a convex shape into an everted shape, wherein the convex shape limits access to the cable receiver.

8. A method for increasing the length of a cable extending from an input device capable of changing the appearance of a display, comprising the step of unwrapping the cable from a cable receiver non-rotatable relative to a body of the input device, the body having an elastically deformable lid disposed thereon and in a substantially convex shape essentially covering the cable receiver.

9. The method of claim 8, further comprising removing the cable from a cable channel disposed in the elastically deformable lid.

* * * * *